Nov. 28, 1933.  H. A. AFFEL  1,936,706
DIRECTIONALLY SELECTIVE SOUND RECEIVER
Filed Dec. 24, 1931
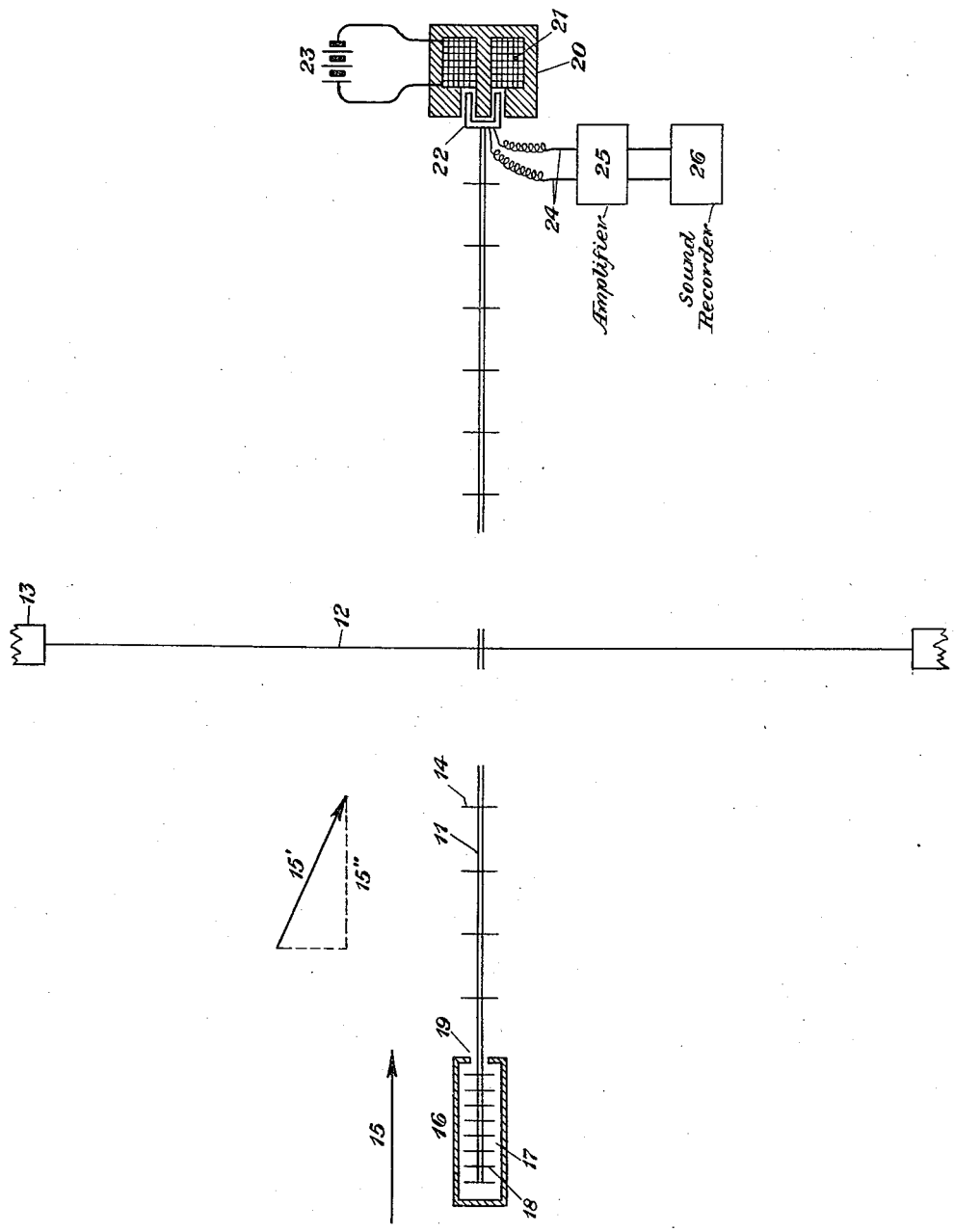
INVENTOR
*H. A. Affel*
BY
ATTORNEY Patented Nov. 28, 1933

1,936,706

UNITED STATES PATENT OFFICE 1,936,706

DIRECTIONALLY SELECTIVE SOUND RECEIVER

Herman A. Affel, Ridgewood, N. J., assignor to American Telephone and Telegraph Company, a corporation of New York Application December 24, 1931
Serial No. 583,085

10 Claims. (Cl. 181—26)

It is among the objects of my invention to provide a new and improved device and a corresponding method for receiving sounds with greater intensity from one direction than from another or other directions. Another object of my invention is to provide for gathering energy effects cumulatively from sound waves progressing in a certain direction to the substantial exclusion of sound waves in other directions. Another object of my invention is to provide for transferring the energy of sound waves from one medium to another cumulatively along the direction of travel of the sound, the second medium being one from which the energy of the sound waves can be taken off more advantageously than from the first medium. Still another object of my invention is to provide a rod or wire, or like element, lying in the direction of sounds to be received selectively, and to build up longitudinal waves therein corresponding to the incoming waves of sound and by these to operate a microphone or like translating device at one end of the rod or wire. All these objects, and various other objects and advantages of my invention will become apparent on consideration of an example of practice according to the invention which I have chosen for disclosure in the following specification. It will be understood that this specification relates principally to this particular example of the invention, and that the scope of the invention will be indicated in the appended claims.

The drawing is a diagram showing apparatus in side elevation, partly in section, with which my invention may be practiced.

Referring to the drawing, let it be assumed that sounds are to be received selectively that come in the form of air waves in the direction of the arrow 15. A long slender rod 11 is supported in this direction by flexible transverse wires or cores 12 attached to fixed members 13. These supports should be so adjusted as to prevent transverse vibrations of the rod 11. The rod 11 carries discs or vanes 14, to each of which the rod is central. The discs 14 are spaced uniformly along the length of the rod 11.

Around the end of the rod 11 toward the sound source, there is a casing 16 containing a viscous medium 17 in which are discs 18 fixed on the end portion of the rod 11. By this means, as will be explained presently in greater detail, longitudinal waves in the rod 11 that arrive at its end within the casing 16 have their energy absorbed there and are not reflected.

At the end of the rod 11 in the direction toward which the sound travels according to the arrow 15, there is fixed a magnet 20 energized by current from battery 23 in coil 21. This magnet has an annular air gap in which lies the coil 22 carried on the end of the rod 11. The circuit of the coil 22 is carried through flexible conductors 24 to the amplifier 25 and the output from this amplifier goes to a sound recorder 26, or other electrical sound receiver device.

The sound waves in the air progressing in the direction 15 will have a certain definite velocity for a given temperature and barometric pressure. The rod 11 may be made of different materials such as rubber but most likely will be made of metal and longitudinal waves therein will normally travel at a higher velocity than the sound waves in the air. But the discs 14 fixed on the rod 11 at intervals along its length will increase its mass without changing its longitudinal elasticity and will reduce the velocity of the longitudinal waves in the rod 11. By varying the weight and size of the discs their effect on the sound transmission system may be controlled. Likewise the action of the rod may be varied by using various materials (the elasticity of the rod depends upon the material of which it is made), and by changing its mass, which in turn depends upon its diameter and density. By such means, with proper adjustment of the material and mass of the rod, and choice of size and weight of the discs, the velocity of the longitudinal waves in the rod 11 is made to be the same as of the sound waves in the air in the direction indicated by the arrow 15.

The sound waves in the air will beat against the discs 14 and thereby impart their energy from the air to create and build up waves of longitudinal vibration in the rod 11. Otherwise stated, the mean position of the molecules of the air will oscillate with the passage of the sound waves so that with each complete passing wave there will be a cycle of greater pressure on one face of the disc 14 followed by greater pressure on the opposite face.

Thus, all along the length of the rod 11 from left to right as viewed in the drawing, there will be a wave of molecular condensation and rarefaction traveling along the rod from left to right at the same rate as the sound wave in air, and all the way, through the discs 14, the sound wave will be putting its energy into the wave in the rod.

At the right hand end as viewed in the drawing, the coil 22 will vibrate in accordance with this cumulated wave in the rod 11. Being in the strong field of the magnet 20, corresponding electromotive forces will be set up in the coil 22 which will be applied to the amplifier 25 and generate corresponding currents to actuate the sound recorder 26.

Sounds traveling in other directions such as indicated by the arrow 15', will tend to impart some of their energy to the discs 14 and thence to the rod 11. But an incipient wave in the rod 11 started from a disc 14 in this way, will travel along the rod 11 faster than the corresponding component 15'' of the air wave travels along beside the rod 11. This will be clear from the following considerations: If a wave front is propagated through the air from a direction at right angles to the rod 11, the wave front will not have any speed of travel in a direction along the line of the rod. If, however, a wave front is transmitted through the air in the direction indicated by the arrow 15' and its velocity in that direction is indicated by the length of the arrow 15', then its velocity may be resolved into two components, one at right angles to the rod and the other along the line of the rod. This latter component is represented at 15''. Now as soon as the wave front passes the vane 14 the waves will be transmitted along the rod 11 at the same velocity as waves coming from the direction represented by the arrow 15, but the longitudinal components of the waves from the direction 15' will only have a velocity in the direction of the rod 11 equal to 15''. Therefore, the propagation of the waves through the air in the direction of the rod 11 will be slower than the propagation in the rod itself. Hence, the wave in the rod 11, in this case, will soon be out of phase with this component of the sound wave in the air, and there will be no substantial building up of energy in the rod 11, as in the case first supposed in connection with the arrow 15.

Thus, the system shown in the drawing will be sensitive to gather sound waves in the direction of the arrow 15 while discriminating against sound waves in other directions such as represented for the arrow 15'. This selectivity will be at all frequencies, hence heterogeneous noise disturbances in other directions, such as 15', will be substantially excluded and only the sounds in the desired direction 15, or close to that direction, will be received. The faces of the discs or vanes being at right angles to the direction of the sound will emphasize the directional effects also.

The magnet 20 and coil 22, and associated elements, will be designed to absorb energy from the vibration of the coil 22 without reflection of such energy along the rod 11. To meet this condition the mechanical impedance of the mechanical system comprising the rod and vanes must be equal to the mechanical impedance of the magnetic system comprising the elements 20 and 22. The mechanical impedance of the system comprising the rod 11 and vanes 14 depends upon the mass and elasticity of the elements. The mechanical impedance of the magnetic system 20—22, to which the rod is connected, depends upon three factors: (1) the magnetic flux in the air gap of the magnet 20; (2) the size and number of turns on the coil 22; and (3) the input impedance of the amplifier 25 which is connected to the coil 22. Therefore, by properly proportioning the magnetic flux in the air gap, the size and number of turns on the coil and the input impedance of the amplifier 25, the mechanical impedance of the magnetic system may be made equal to that of the wave transmission system 11—14.

That is, there will be such an adjustment of design that a certain energy absorbing resistance will be offered to the vibration of the coil 22 in the air gap of the magnet 20, and this resistance or mechanical impedance will be properly related to the values of mechanical elasticity and mass in the rod so that the energy of vibration that arrives along the rod 11 at the end carrying the coil 22 will all be absorbed in overcoming the resistance mentioned, and there will be no substantial amount of energy in the form of reflected waves traveling along the rod 11 from right to left as viewed in the drawing. Obviously, the waves in the rod instead of being translated into electrical energy in this manner might be converted into some other form.

However, in so far as longitudinal waves may be set up in the rod 11 traveling from right to left, when such waves arrive at the end of the rod 11 within the casing 16 their energy will be absorbed in the viscous medium 17 and no reflections will occur in the rod 11 from that end. The resistance offered by the medium 17 through the vanes or discs 18 will be adjusted to have the proper relation to the mechanical elasticity and mass of the rod, so that all the energy of longitudinal vibration that may arrive at this end of the rod 11 will be absorbed into the viscous medium 17 and there will be no reflection of energy back along the rod 11.

For adjusting the mass of the rod 11 per unit length to get the velocity of longitudinal waves the same in the rod as in the air, choice may be made of a suitable material for the rod instead of or in conjunction with the expedient of loading the rod by proportioning of the discs 11.

The device disclosed may be used for reception of sound waves under water by making suitable adjustment in the velocity of transmission in the rod 11 to agree with the greater velocity of sound in water.

My improved directionally selective sound receiver has the advantage over many other devices that have been used for the purpose, in that such other devices almost inevitably are selective according to frequency as well as according to direction, whereas my device receives a wide range of frequencies impartially. The length of the rod 11 in my system should be at least as long as the wave length for the lowest pitched sound that is to be received, and it will be better to have it several times this wave length. If it is desired to emphasize some frequencies more than others, this can be done readily by a differential amplifier or attenuator interposed in the conductor 24 and operating with respect to the desired intensity of the different frequencies instead of being hampered by an inflexible differential frequency selectivity in the apparatus.

The system shown in the drawing can be used with little, if any, modification as a directionally selective sound transmitter. In this case electric currents corresponding to the sounds to be transmitted will be sent through the conductors 24 into the coil 22 causing it to vibrate in correspondence with those currents. Such vibration will be communicated in longitudinal vibrations to the rod 11, and these will travel along the length of the rod imparting part of their energy to the air at each disc 14 and building up an air wave of greater and greater sound intensity in the direction opposite to the arrow 15. Though the radiation from one disc alone would scatter widely, the combined radiation from the plurality of discs will give an interference pattern with annulment of intensity in directions transverse to the rod 11 and enhancement in the direction opposite to the arrow 15.

What is claimed is:

1. The method of receiving with directional selectivity from a fluid medium which consists in absorbing the energy of the sound from the medium at various points along a line of travel of the sound, and transmitting corresponding energy effects at the same velocity as the sound to a point in said line, and there cumulating these energy effects and translating them to a desired form of energy.

2. The method of transferring sound energy from a fluid medium to a solid rod with directional selectivity and thence to a translating device which consists in transferring the energy of the sound from the said medium into a solid rod at various points along its length, said rod lying in the direction of the sound transmission, conveying said energy along the rod to its end and there translating it to a desired form to be utilized.

3. The method of receiving sound from a medium of low density which consists in transferring the energy of the sound wave into a medium of higher density extending along the direction of travel of the sound, adjusting the physical character of the last mentioned medium to make the velocity of the sound the same as in the first mentioned medium, and translating the cumulated energy in the second medium to a desired form.

4. The method of transferring sound waves selectively according to direction between a fluid medium and a local device, which consists in establishing the waves in an intermediate stage in a medium of greater density extending in the direction of the sound waves in the said fluid medium, with transfer of energy between the two media at various points along the extension of the denser medium and with adjustment of transmission in the denser medium to the same velocity as in the said fluid medium.

5. A directionally selective sound receiver comprising, a rod in the medium from which the incoming sound is to be received and lying in the direction thereof, transverse discs or vanes mounted along said rod, the system of rod and discs being adjusted to have the same velocity of longitudinal wave transmission as of the sound in the said medium, means at the ends of the rod to absorb the energy of longitudinal vibrations without reflection, and means at the end distant from the sound source to convert the absorbed energy into corresponding electric impulses.

6. A directionally selective sound receiver comprising a rod in the medium from which the incoming sound is to be received and lying in the direction thereof, said rod being equipped and proportioned to determine the velocity of longitudinal vibrations therein at the same value as the velocity of sound in the said medium, and means associated with the rod at one place along its length to convert longitudinal waves therein to corresponding electromagnetic impulses.

7. A directionally selective sound receiver comprising means in the medium from which the incoming sound is to be received, said means being extended in a line of travel of the sound and being adapted to transmit energy effects therein to a point in such line at the same velocity as the velocity of the sound in the medium, and means at said point to cumulate such effects and translate them to a desired form of energy.

8. A directionally selective sound receiver comprising a rod in the medium from which the incoming sound is to be received and lying in the direction thereof, means associated with said rod to receive the energy of sound waves in the medium and impart this energy to the rod, said rod being of such material and of such mass and said means being so related thereto that longitudinal vibrations in the rod will be transmitted at the same velocity as the velocity of the sound in the said medium, and means associated with the rod at one place along its length to convert longitudinal waves therein to corresponding electromagnetic impulses.

9. Means for receiving sounds selectively from a fluid medium in accordance with a preferred direction comprising a rod lying in that direction, means along the rod to transmit the sound vibrations from the medium into the rod, said rod being of such material and of such mass and said members being so related thereto that the sound vibrations in the rod will have the same velocity as in the medium, and a translating device associated with the rod to convert the vibrations of the rod into electromagnetic energy.

10. Means for transferring sound selectively according to direction between two media, consisting of a long rod of the denser medium lying in the rarer medium in the direction of transfer of the sound waves therein, said rod being equipped and proportioned to adjust the speed of longitudinal waves in the rod to the same velocity as in the rarer medium, means disposed along the rod to transfer wave energy between the rod and the other medium, translating means at an end of the rod, and coupling means to transfer energy at that place without reflection.

HERMAN A. AFFEL.